US010679039B2

(12) United States Patent
Gallagher et al.

(10) Patent No.: US 10,679,039 B2
(45) Date of Patent: Jun. 9, 2020

(54) DETECTING ACTIONS TO DISCOURAGE RECOGNITION (71) Applicant: Google LLC, Mountain View, CA (US)

(72) Inventors: Andrew Gallagher, Fremont, CA (US); Praveen Bommannavar, Mountain View, CA (US); Teresa Ko, Pacific Palisades, CA (US)

(73) Assignee: Google LLC, Mountain View, CA (US)

( * ) Notice: Subject to any disclaimer, the term of this patent is extended or adjusted under 35 U.S.C. 154(b) by 121 days.

(21) Appl. No.: 15/943,961

(22) Filed: Apr. 3, 2018

(65) Prior Publication Data
US 2019/0303651 A1    Oct. 3, 2019

(51) Int. Cl.
*G06K 9/00* (2006.01)
*G06T 7/13* (2017.01)

(52) U.S. Cl.
CPC ..... *G06K 9/00255* (2013.01); *G06K 9/00268* (2013.01); *G06K 9/00342* (2013.01); *G06K 9/00355* (2013.01); *G06T 7/13* (2017.01); *G06K 9/00228* (2013.01); *G06K 9/00302* (2013.01); *G06T 2207/10016* (2013.01); *G06T 2207/30201* (2013.01)

(58) Field of Classification Search
CPC ........................................... G06T 2207/30201
See application file for complete search history.

(56) References Cited

U.S. PATENT DOCUMENTS

| 9,311,525 | B2 | 4/2016 | Kim et al. | |
|---|---|---|---|---|
| 10,027,727 | B1* | 7/2018 | Ozog | G06Q 10/00 |
| 2013/0004090 | A1* | 1/2013 | Kundu | G06Q 20/206 |
| | | | | 382/232 |
| 2015/0104103 | A1 | 4/2015 | Candelore | |
| 2016/0034704 | A1* | 2/2016 | Shim | H04N 1/4486 |
| | | | | 726/26 |
| 2018/0278835 | A1* | 9/2018 | Meganathan | H04N 5/23203 |
| 2018/0307819 | A1* | 10/2018 | Yuan | G06F 21/32 |

OTHER PUBLICATIONS

"CV Dazzle: Camouflage from Face Detection", Accessed at http://cvdazzle.com/ on Apr. 4, 2018, 7 pages.

(Continued)

*Primary Examiner* — Oneal R Mistry
(74) *Attorney, Agent, or Firm* — IP Spring (57) ABSTRACT

A method to determine whether to perform recognition on an image or a video. The method includes detecting a person in an image or a video by determining a person image region that corresponds to boundaries of the person or a face image region that corresponds to a position of a face of the person. The method further includes analyzing pixel values that correspond to the boundaries of the person or the position of the face of the person to generate a recognition avoidance signal. The method further includes determining whether the recognition avoidance signal indicates that an action was taken to discourage recognition of the person. The method further includes responsive to the recognition avoidance signal indicating that the action was taken to discourage recognition of the person, declining to perform recognition of the person.

19 Claims, 6 Drawing Sheets (56) References Cited

OTHER PUBLICATIONS

Oh, "Faceless Person Recognition: Privacy Implications in Social Media", European Conference on Computer Vision. Springer, Cham, 2016, 26 pages.
Sah, et al., "Detection without Recognition for Redaction", Accessed at http://vision.soic.indiana.edu/bright-and-dark-workshop-2017/Detection_without_Recognition_for_Redaction.pdf on Apr. 4, 2018, 3 pages.
Sharif, et al., "Adversarial Generative Nets: Neural Network Attacks on State-of-the-Art Face Recognition", arXiv preprint arXiv:1801.00349., 2017, 16 pages.
Sun, et al., "Natural and Effective Obfuscation by Head Inpainting", arXiv preprint arXiv:1711.09001., 2017, 16 pages.
Shu, et al., "Cardea: Context-Aware Visual Privacy Protection from Pervasive Cameras", Retrieved from Internet: https://arxiv.org/pdf/1610.00889.pdf, Oct. 4, 2016, 10 pages.
WIPO, International Search Report for International Patent Application No. PCT/US2019/016553, dated May 15, 2019, 4 pages.
WIPO, Written Opinion for International Patent Application No. PCT/US2019/016553, dated May 15, 2019, 6 pages.

* cited by examiner

DETECTING ACTIONS TO DISCOURAGE RECOGNITION

BACKGROUND

The specification relates to a recognition application that determines whether to perform recognition of a person in an image or a video.

When a person does not want to be recognized in an image or a video, it used to be sufficient to obscure the person's face because obscuring the person's face would prevent a facial recognition algorithm from identifying enough facial characteristics to perform facial recognition. However, in modern computer vision systems, people can also be recognized in an image or from a sequence of images or in a video by extracting features from the entire body, even when the face is not visible or is highly occluded. For example, a person wearing a distinctive shirt in a first photo can be recognized by first discovering that shirt being worn in another photo where the face is visible, and then by recognizing that person. Likewise, a person can be recognized by a distinctive haircut, an item of jewelry, a tattoo, an item being held, posture or any other indicators. As a result, modern computer vision systems may identify people against their wishes.

The background description provided herein is for the purpose of generally, presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments generally relate to a method to determine whether to perform recognition on an image or a video. The method includes detecting a person in an image or a video by determining a person image region that corresponds to boundaries of the person or a face image region that corresponds to a position of a face of the person. The method further includes analyzing pixel values that correspond to the boundaries of the person or the position of the face of the person to generate a recognition avoidance signal. The method further includes determining whether the recognition avoidance signal indicates that an action was taken to discourage recognition of the person. The method further includes responsive to the recognition avoidance signal indicating that the action was taken to discourage recognition of the person, declining to perform recognition of the person.

In some embodiments, declining to perform recognition of the person includes performing at least one of storing the recognition avoidance signal in association with the image or video to indicate that person recognition is not to be performed, deleting the image or video, archiving the image or video, or downranking the image or video in search results. In some embodiments, the method further comprises responsive to the recognition avoidance signal not indicating that the action was taken to discourage recognition of the person, performing recognition of the person by determining an identity of the person and indexing the image or the video in association with the identity. In some embodiments, determining that the action was taken to discourage recognition of the person further includes a determination that the recognition avoidance signal corresponds to an avoidance value that does not meet a threshold value and performing recognition of the person is also responsive to the avoidance value not meeting the threshold value. In some embodiments, the person is a first person, determining that the action was taken to discourage recognition of the person further includes a determination that the recognition avoidance signal corresponds to an avoidance value that meets a threshold value, and the method further comprises responsive to the avoidance value meeting the threshold value, detecting a second person in the image and generating the recognition avoidance signal for the second person. In some embodiments, the action includes (1) the person using an object to obscure at least part of the face of the person or (2) at least part of the face of the person being obscured digitally. In some embodiments, performing recognition of the person is based on extracting a recognition template. In some embodiments, wherein the image is a first image, the video is a first video, and further comprising: identifying one or more additional images or one or more additional videos that are associated with an event and determining to not recognize the person within the one or more additional images or the one or more additional videos. In some embodiments, determining that the recognition avoidance signal indicates that the action was taken to discourage recognition of the person includes determining a type of action and further comprising: performing recognition of the person by identifying the person and sharing an identification of the person with a group of users in a social network based on the type of action and not sharing the identification of the person with any users that are not part of the group of users in the social network.

In some embodiments, a non-transitory computer readable medium includes instructions stored thereon that, when executed by one or more computers, cause the one or more computers to perform operations, the operations comprising: detecting a person in an image or a video by determining a person image region that corresponds to boundaries of the person or a face image region that corresponds to a position of the face of the person, analyzing pixel values that correspond to the boundaries of the person or the position of the face of the person to generate a recognition avoidance signal, determining whether the recognition avoidance signal indicates that an action was taken to discourage recognition of the person, and responsive to the recognition avoidance signal not indicating that the action was taken to discourage recognition of the person, performing recognition of the person.

In some embodiments, performing recognition of the person comprises determining an identity of the person and indexing the image or the video in association with the identity. In some embodiments, the operations further comprise: responsive to the recognition avoidance signal indicating that the action has been taken to discourage recognition of the person, performing at least one of storing the recognition avoidance signal in association with the image or video to indicate that person recognition is not to be performed, deleting the image or video, archiving the image or video, or downranking the image or video in search results. In some embodiments, the operations further comprise: responsive to the recognition avoidance signal indicating that the action has been taken to discourage recognition of the person, determining whether the recognition avoidance signal corresponds to an avoidance value that meets a threshold value and responsive to the avoidance value failing to meet the threshold value, performing recognition of the person. In some embodiments, the action includes (1) the person using an object to obscure at least part of the face of the person or (2) at least part of the face of the person being obscured digitally. In some embodiments, the operations further comprise: determining permissions associated with the person and wherein performing recognition of the person is based on the permissions associated with the person.

In some embodiments, a system comprises one or more processors and a memory that stores instructions executed by the one or more processors, the instructions comprising: detecting a person in an image or a video by determining a person image region that corresponds to boundaries of the person or a face image region that corresponds to a position of the face of the person, analyzing pixel values that correspond to the boundaries of the person or the position of the face of the person to generate a recognition avoidance signal, determining whether the recognition avoidance signal indicates that an action was taken to discourage recognition of the person, and responsive to the recognition avoidance signal not indicating that the action was taken to discourage recognition of the person, performing recognition of the person.

In some embodiments, declining to perform recognition of the person includes performing at least one of storing the recognition avoidance signal in association with the image or video to indicate that person recognition is not to be performed, deleting the image or video, archiving the image or video, or downranking the image or video in search results. In some embodiments, the memory stores additional instructions comprising: responsive to the recognition avoidance signal not indicating that the action was taken to discourage recognition of the person, performing recognition of the person by determining an identity of the person and indexing the image or the video in association with the identity. In some embodiments, determining that the action was taken to discourage recognition of the person further includes a determination that the recognition avoidance signal corresponds to an avoidance value that does not meet a threshold value and performing recognition of the person is also responsive to the avoidance value not meeting the threshold value. In some embodiments, the person is a first person, determining that the action was taken to discourage recognition of the person further includes a determination that the recognition avoidance signal corresponds to an avoidance value that meets a threshold value, and the memory stores additional instructions comprising, responsive to the avoidance value meeting the threshold value, detecting a second person in the image and generating the recognition avoidance signal for the second person.

The various embodiments described below advantageously prevent a person from being recognized in an image when the person does not want to be recognized. Preventing recognition may include preventing the person from being identified and the image from being indexed in association with an identity of the person. In some embodiments, recognition may include multiple levels, such as (1) deleting the image; (2) not performing recognition of a person in the image; (3) performing recognition of the person in the image, but only sharing an identification of the person with users that have authorization to know the person's identity from the person.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example System

Figure 1:
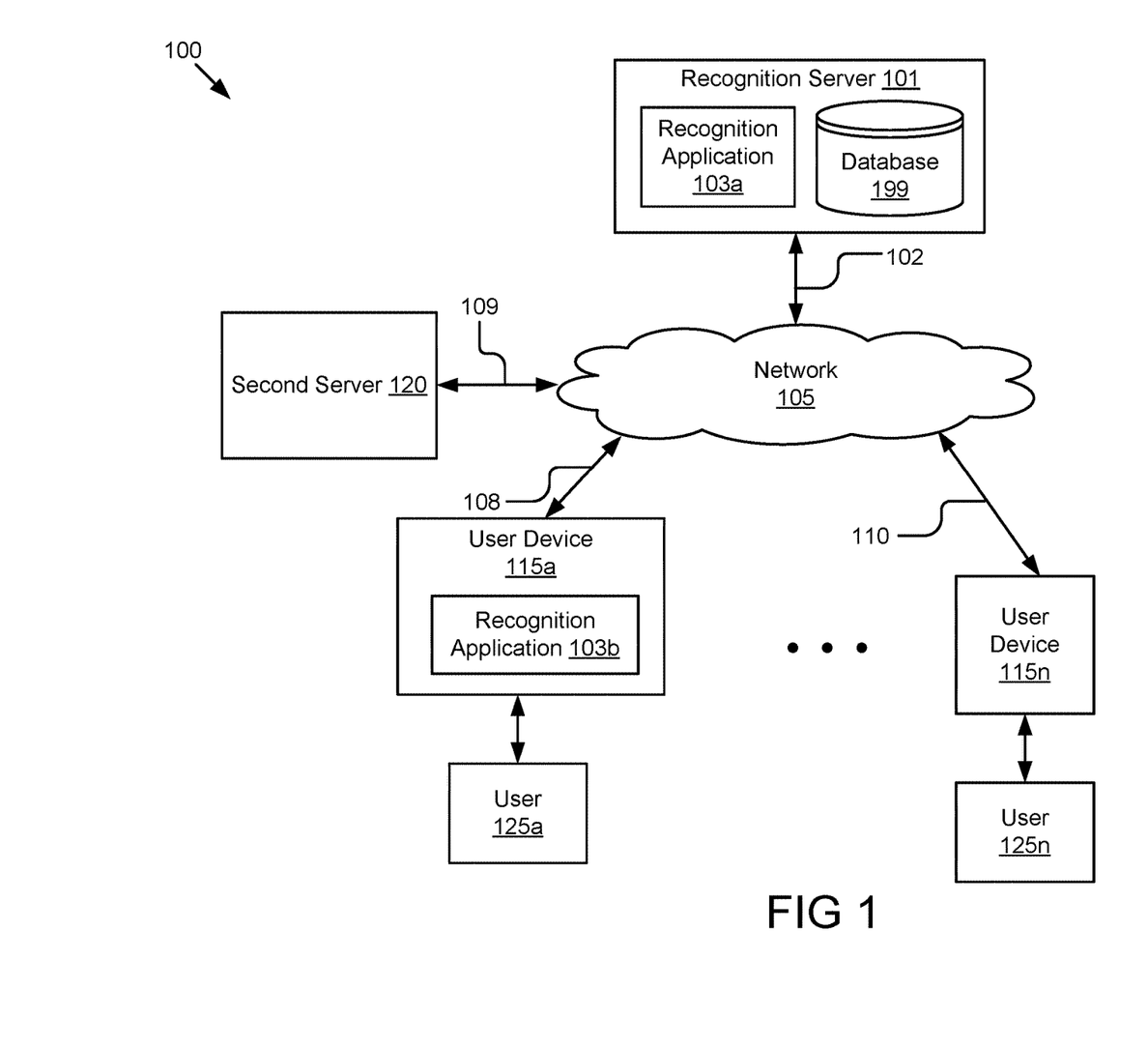
FIG. 1 illustrates a block diagram of an example system that determines whether to perform recognition of a person in an image or a video according to some embodiments.

FIG. 1 illustrates a block diagram of an example system 100 that determines whether to perform recognition of a person in an image or a video. The illustrated system 100 includes a recognition server 101, user devices 115a, 115n, a second server 120, and a network 105. Users 125a, 125n may be associated with respective user devices 115a, 115n. In some embodiments, the system 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The recognition server 101 may include a processor, a memory, and network communication capabilities. In some embodiments, the recognition server 101 is a hardware server. The recognition server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the recognition server 101 sends and receives data to and from one or more of the user devices 115a, 115n and the second server 120 via the network 105. The recognition server 101 may include a recognition application 103a and a database 199.

The recognition application 103a may be code and routines operable to determine whether to perform recognition of a person in an image or a video. In some embodiments, the recognition application 103a may be implemented using hardware including a field-programmable gate array (FPGA) or an application-specific integrated circuit (ASIC). In some embodiments, the recognition application 103a may be implemented using a combination of hardware and software.

The database 199 may store animated objects, messaging streams, etc. For example, the database 199 may store images and/or videos. In embodiments where people are recognized in images and videos, the database 199 may store images and videos that are indexed and associated with identities of the people. For example, an image may be indexed in association with metadata that describes a user of a social network including a link to a profile of the user of the social network. The database 199 may also store social network data associated with users 125, user preferences for the users 125, etc.

The user device 115 may be a computing device that includes a memory and a hardware processor. For example, the user device may include a desktop computer, a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115*a* is coupled to the network 105 via signal line 108 and user device 115*n* is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. User devices 115*a*, 115*n* are accessed by users 125*a*, 125*n*, respectively. The user devices 115*a*, 115*n* in FIG. 1 are used by way of example. While FIG. 1 illustrates two user devices, 115*a* and 115*n*, the disclosure applies to a system architecture having one or more user devices 115.

In some embodiments, the user device 115 can be a user device that is included in a wearable device worn by the user 125. For example, the user device 115 is included as part of a clip (e.g., a wristband), part of jewelry, or part of a pair of glasses. In another example, the user device 115 can be a smart watch. The user 125 may data associated with the recognition application 103 on a display of the device worn by the user 125. For example, the recognition application 103*a* may display images, videos, and/or a question about permission associated with a person recognized in an image or a video on a display of a smart watch or a smart wristband.

In some embodiments, recognition application 103*b* may be stored on a user device 115*a*. The recognition application 103 may include a thin-client recognition application 103*b* stored on the user device 115*a* and a recognition application 103*a* that is stored on the recognition server 101. For example, the recognition application 103*b* stored on the user device 115*a* may display a messaging stream that includes an animated object. The user device 115*a* may include a camera that captures an image or video that the recognition application 103*b* sends to the recognition server 101 for processing. The recognition application 103*a* stored on the recognition server 101 may receive the image or video and determine whether a recognition avoidance signal associated with the image or the video indicates that an action was taken to discourage recognition of the person.

The second server 120 may include a processor, a memory, and network communication capabilities. The second server 120 may access the network 105 via signal line 109. The second server 120 may include an application that uses information about people that are recognized in images and videos by the recognition application 103*a*. For example, the second server 120 may include a social network application that receives identification information about people in images and videos from the recognition application 103*a* and associates the identification information with users of the social network application. In another example, the second server 120 may include a photo editing application for digitally obscuring an image or a video, for example, by blurring or pixelating faces of people in the image. In yet another example, the second server 120 may include a photo application, a calendar application, an event organizer application, etc.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth® communication networks, WiFi®, wireless local area network (WLAN) computer communication specified by IEEE 902.11, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the recognition server 101, in practice one or more networks 105 may be coupled to these entities.

In situations in which the systems and methods discussed herein may collect or use personal information about users (e.g., user data, information about a user's social network, a user's location, a user's biometric information, a user's activities and/or demographic information, storage and analysis of images or video by the recognition server 101 or recognition application 103, etc.), users are provided with opportunities to control whether personal information is collected, whether the personal information is stored, whether the personal information is used, whether the images or videos are analyzed, and how information about the user is collected, stored, and used. That is, the systems and methods discussed herein may collect, store, and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity information may be treated, e.g., anonymized, so that no personally identifiable information can be determined from a video. As another example, a user's geographic location may be generalized to a larger region so that the user's particular location cannot be determined.

Example Computing Device

Figure 2:
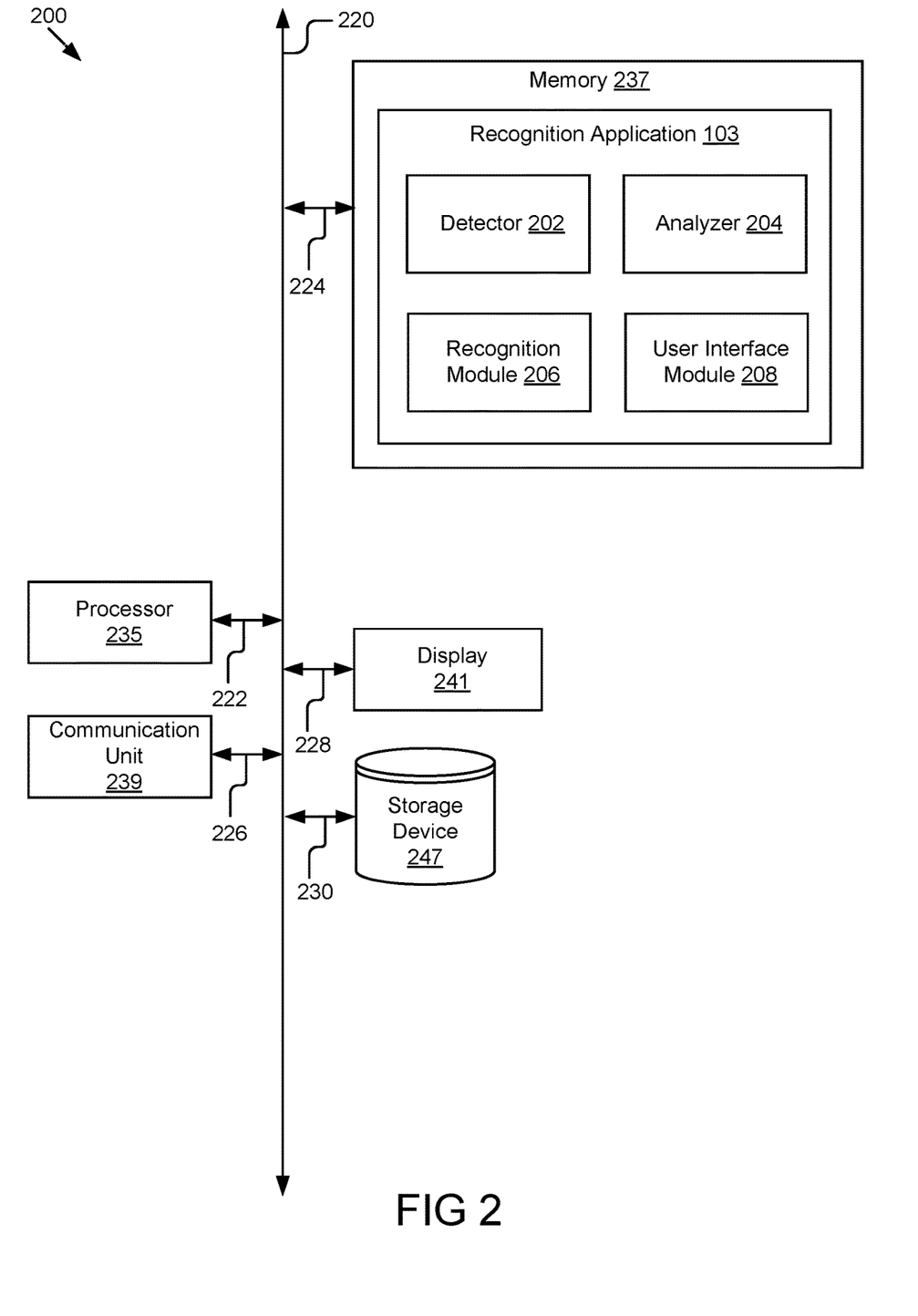
FIG. 2 illustrates a block diagram of an example computing device that determines whether to perform recognition of a person in an image or a video according to some embodiments.

FIG. 2 illustrates a block diagram of an example computing device 200 that determines whether to recognize a person in an image or a video. The computing device 200 may be a recognition server 101, a user device 115, or a combination of a recognition server 101 and a user device 115. The computing device 200 may include a processor 235, a memory 237, a communication unit 239, a display 241, and a storage device 247. Additional components may be present or some of the previous components may be omitted depending on the type of computing device 200. For example, if the computing device 200 is the recognition server 101, the computing device 200 may not include the display 241. A recognition application 103 may be stored in the memory 237. In embodiments where the computing device 200 is a wearable device, the computing device 200 may not include storage device 247. In some embodiments, the computing device 200 may include other components not listed here, such as a battery, etc. The components of the computing device 200 may be communicatively coupled by a bus 220.

The processor 235 includes an arithmetic logic unit, a microprocessor, a general purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the recognition application 103, which is described in greater detail below. The memory 237 is coupled to the bus 220 for communication with the other components via signal line 224.

The communication unit 239 transmits and receives data to and from at least one of the user device 115 and the recognition server 101 depending upon where the recognition application 103 may be stored. In some embodiments, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115 or the recognition server 101, depending on where the recognition application 103 may be stored. In some embodiments, the communication unit 239 includes a wireless transceiver for exchanging data with the user device 115, recognition server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some embodiments, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some embodiments, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The display 241 may include hardware operable to display graphical data received from the recognition application 103. For example, the display 241 may render graphics to display an image or a question about permissions associated with an image. The display 241 is coupled to the bus 220 for communication with the other components via signal line 228.

The storage device 247 may be a non-transitory computer-readable storage medium that stores data that provides the functionality described herein. In embodiments where the computing device 200 is the recognition server 101, the storage device 247 may include the database 199 in FIG. 1. The storage device 247 may be a DRAM device, a SRAM device, flash memory or some other memory device. In some embodiments, the storage device 247 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The storage device 247 is coupled to the bus 220 for communication with the other components via signal line 230.

The recognition application 103 may include a detector 202, an analyzer 204, a recognition module 206, and a user interface module 208.

The detector 202 detects a person in an image or a video. In some embodiments, the detector 202 includes a set of instructions executable by the processor 235 to detect the person. In some embodiments, the detector 202 is stored in the memory 237 of the computing device 200 and can be accessible and executable by the processor 235.

In some embodiments, the detector 202 processes an image or a video using computer vision algorithms. The computer vision algorithms may include a person detector and a face detector for detecting people and/or faces. The person detector and the face detector may use person templates and face templates that describe templates for data associated with a person and a face, respectively. For example, the person templates and the face templates may correspond to object priors that describe different types of people and faces. The face templates and the person templates may be based on expected points that correspond to an expected face or person. For example, a person template may include the expected location of a head, shoulders, arms, chest, legs, feet, etc. and the distance between locations. The detector 202 may also determine whether the locations of points on a person correspond to poses for people. For example, the points may correspond to a person that is standing, sitting, running, etc.

The detector 202 may determine a person image region that corresponds to boundaries of the person or a face image region that corresponds to a position of the face of the person. For example, the detector 202 may generate a bounding box that surrounds a face and/or a body of a person. In some embodiments, the detector 202 may detect a face based on facial points and a distance between the facial points. For example, the detector 202 may identify eyes, eyebrows, a nose, and a mouth, and hair and confirm that these facial points correspond to a face if the facial points correspond to expected distances between the facial points. The detector 202 may determine the face based on a convex hull by generating a shape from the facial points (e.g., a convex polygon) and confirming that the shape corresponds to an expected shape for a face. In some embodiments where an image includes a pixel mask instead of a face, the detector 202 may identify the pixel mask and determine that the pixel mask corresponds to a face. In some embodiments, the detector 202 may use clustering to identify people. In examples where the detector 202 is processing a video, the detector 202 may process each image frame of the video to detect faces and/or people.

The analyzer 204 generates a recognition avoidance signal. In some embodiments, the analyzer 204 includes a set of instructions executable by the processor 235 to generate the recognition avoidance signal. In some embodiments, the analyzer 204 is stored in the memory 237 of the computing device 200 and can be accessible and executable by the processor 235.

The analyzer 204 processes each detected person and/or face in the image or video to determine a recognition avoidance signal that indicates whether the person appeared to have not wanted to be photographed or whether the photo was edited to mask or alter the identity of the person.

The analyzer 204 may generate the recognition avoidance signal by analyzing pixel values that correspond to the boundaries of the person or the position of the face of the person. The analyzer 204 may determine whether the recognition avoidance signal indicates that an action was taken to discourage recognition of the person. For example, the action may include the person using an object in the image to obscure at least part of the face of the person where the object is a body part, such as a hand, clothing, etc. FIGS. 3A-3D illustrate examples of different actions taken by a person in images to discourage recognition according to some embodiments. Alternatively or in addition, the action may include obscuring at least part of the person's face digitally.

Figure 3A:
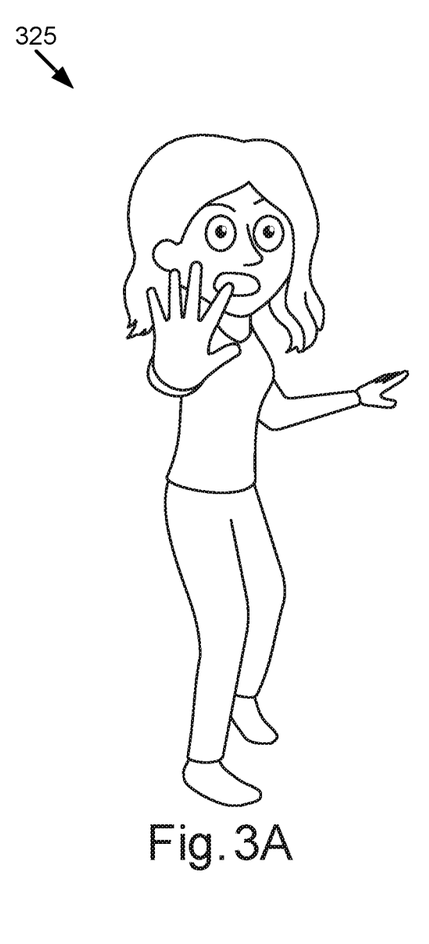
FIGS. 3A-3D illustrate examples of different actions taken by a person in images to discourage recognition according to some embodiments.

Turning to FIG. 3A, an image 300 includes a woman that has her hand up in what may be an indication that the woman did not want to be recognized in the image. Because the woman's hand is not completely obscuring her face, it is not clear whether she was trying to obscure her face, she was moving her hand to grab something, or she was about to wave at someone.

In some embodiments, the analyzer 204 may generate the recognition avoidance signal by analyzing pixel values that correspond to the boundaries of the person or the position of the face of the person and a facial expression of the person. The analyzer 204 may categorize a person's expression based on template expressions, such as, happy, sad, angry, worried, etc. The template expressions may be based on a person's mouth being upturned, straight, downturned, or wide; a person's eyes being wide, closed, scrunched; a person's eyebrows being raised or at an angle; a person's frown wrinkles being visible, etc. For example, in FIG. 3A, the analyzer 204 may determine that the woman does not want to be recognized because some of her hand overlaps with her face and she has an expression of concern as indicated by her mouth forming an O, her eyes being wide, and her eyebrows being raised. Conversely, if the hand was in the same position but the woman was smiling, the analyzer 204 may determine that the woman was fine with being recognized in the image.

In some embodiments, the analyzer 204 scores the recognition avoidance signal by determining an avoidance value that corresponds to the recognition avoidance signal. In some embodiments, if the avoidance value meets a threshold value, the analyzer 204 determines that an action was taken to discourage recognition of the person. Other schemes are possible, such as determining that an action was taken to discourage recognition of the person if the avoidance value fails to meet the avoidance value. The analyzer 204 may determine an avoidance value based on a percentage of a face that is obscured. For example, the analyzer 204 may determine that if more than 50% of the face is obscured, the person took an action to discourage recognition of the person. In another example, the analyzer 204 determines that because the image of the person includes the face being obscured and the person is in a scrunched-up position, the avoidance value is 90 out of a scale of 100.

Figure 3B:
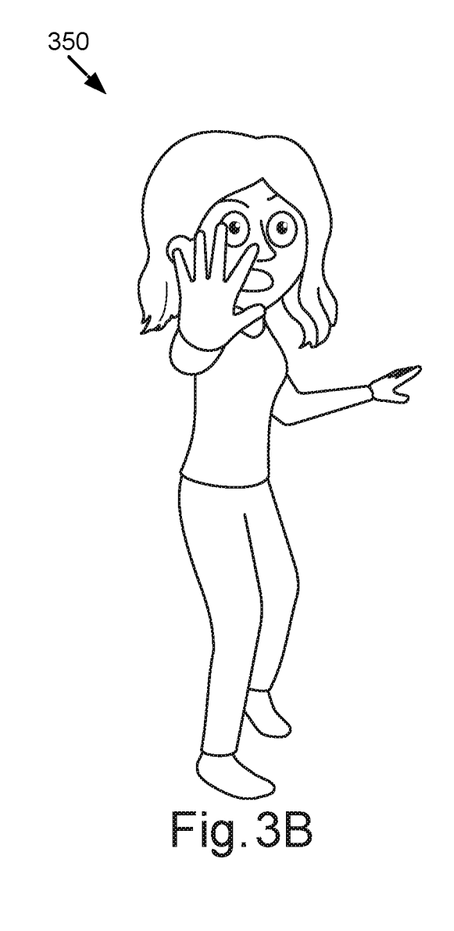

Turning to FIG. 3B, an image 325 includes a woman showing an indication that she did not want to be recognized in the image. In this example, a larger portion of the woman's face is obscured by her hand, which is a stronger indication that the woman did not want to be recognized in the image. In some embodiments, the analyzer 204 may process a series of images associated with an event and generate the recognition avoidance signal based on the series of images. For example, FIG. 3A and FIG. 3B may be part of the same event. The analyzer 204 may determine that because both images of the woman include at least a portion of her face being obscured with her hand, the woman indicated that the woman did not want to be recognized in the image. The analyzer 204 may generate an avoidance value that is based on the series of images. For example, the analyzer 204 may determine based on FIGS. 3A and 3B that the woman did not want to be recognized because the average (or mean) of the avoidance value for the two images corresponds to an avoidance value that meets the threshold value (or exceeds, or falls below, etc.). In another example, the analyzer 204 may determine based on FIG. 3A, FIG. 3B, and a series of images where the woman does not have her hand over her face that the woman is not opposed to being recognized.

Figure 3C:
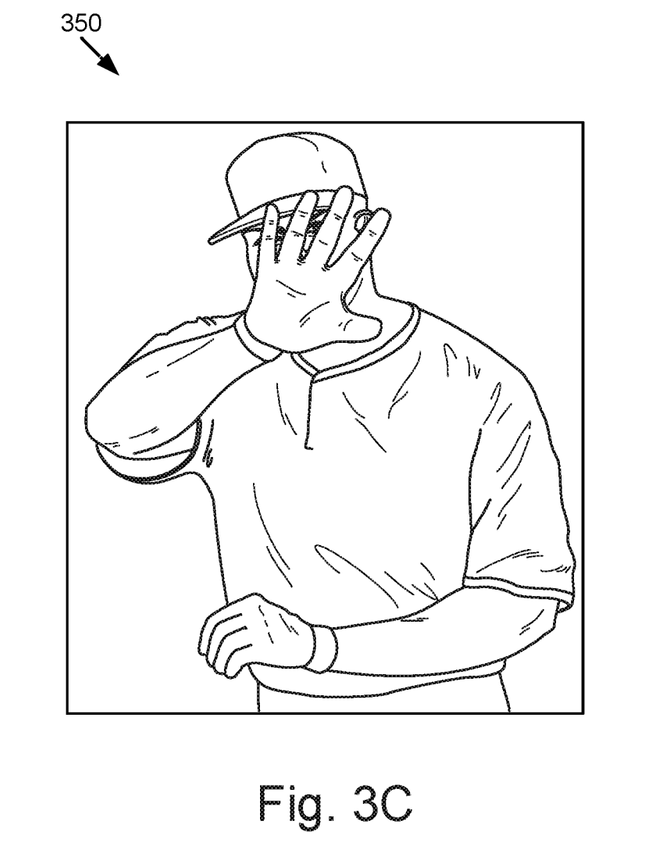

Turning to FIG. 3C, an image 350 includes a man with his hand almost completely obscuring his face. This is an example of a person that does not want to be recognized. In some embodiments, no other actions may counteract such a direct indication that the person does not want to be recognized. For this example, the analyzer 204 generates a recognition avoidance signal that indicates that the person does not want to be recognized.

Figure 3D:
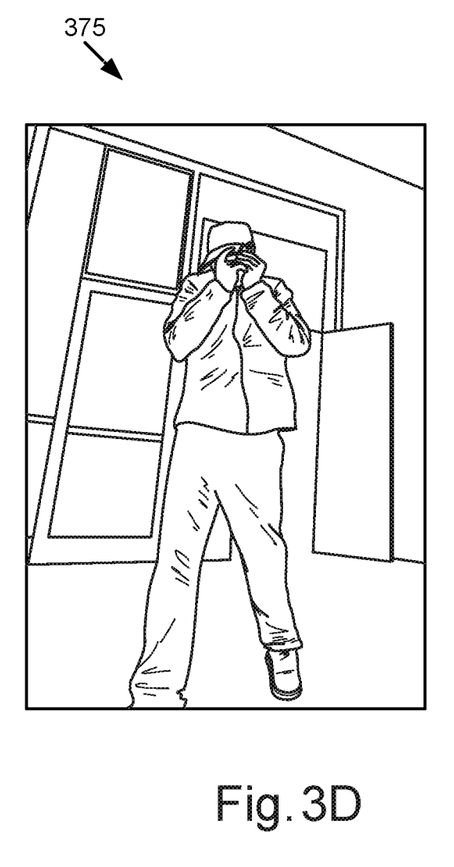

Turning to FIG. 3D, an image 375 includes a person with a hat pulled down over the top of the person's face and hands in front of the bottom part of the person's face. This is another example of a person that does not want to be recognized. For this example, the analyzer 204 generates a recognition avoidance signal that indicates that the person does not want to be recognized.

The analyzer 204 may determine that the recognition avoidance signal indicates that an action was taken to discourage recognition of the person where the action includes at least part of the face of the person being obscured digitally. Digitally obscuring a face may include blurring, pixelating, or masking a face. A user may digitally obscure a face using editing software that is part of a camera or photo editing software on a user's phone. A user may also use third party software, such as software provided by a second server 120 to digitally obscure a face.

Figure 4:
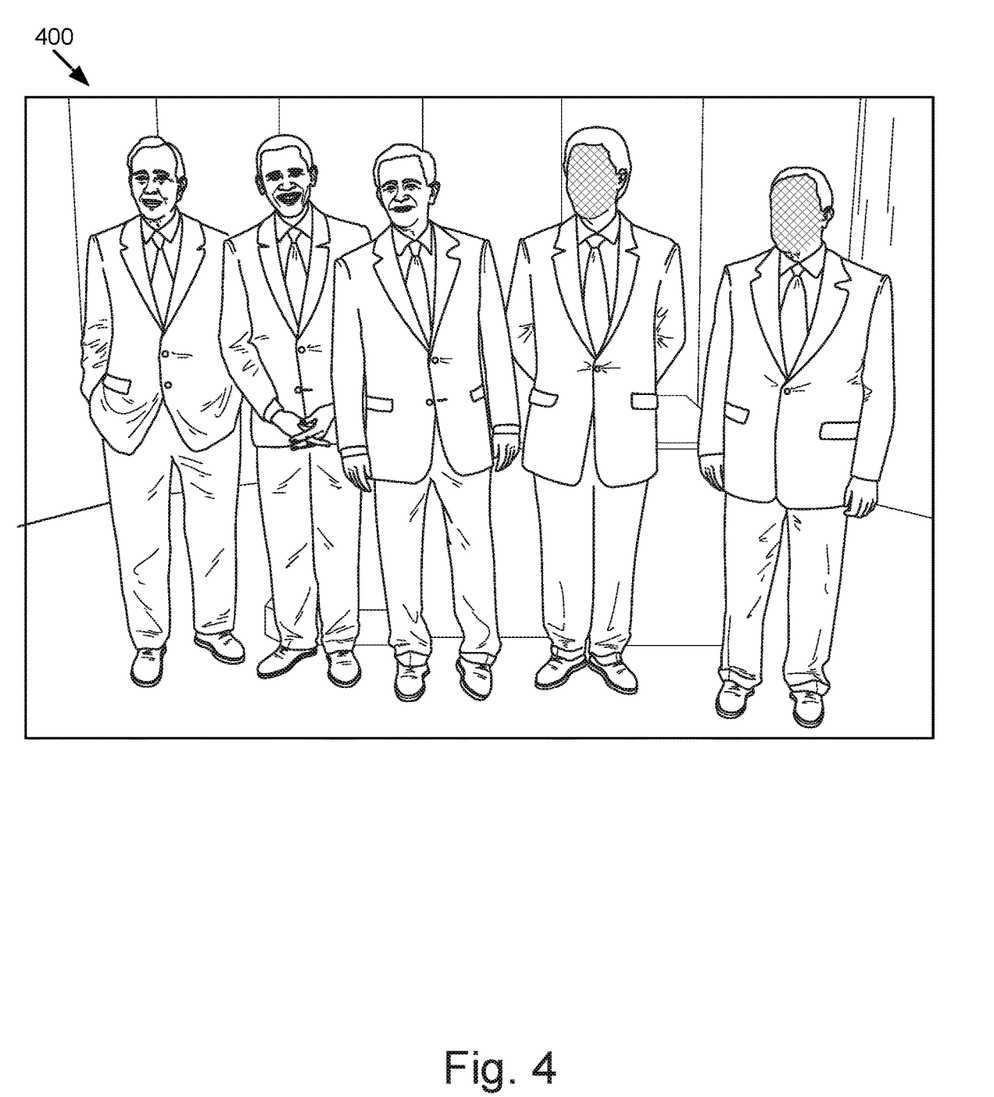
FIG. 4 illustrates an example digital alteration of people in an image to discourage recognition according to some embodiments.

Turning to FIG. 4, an example image 400 is illustrated that includes a digital alteration of people to discourage recognition. In this example, the two people on the right are illustrated as having pixelated faces. The user may have performs post-processing of the image to add the pixilation to those faces. The analyzer 204 may determine, based on the user digitally obscuring the two people on the right, that an action was taken to discourage the two people on the right from being recognized. As a result, the analyzer 204 may generate a recognition avoidance signal for each of those two people to indicate that they should not be identified. As discussed in greater detail below, the recognition module 206 may determine to not perform recognition of those two people. However, the recognition module 206 may determine to perform recognition of the three people in the left part of the image 400 because the faces of those three people are not obscured.

In some embodiments, the analyzer 204 determines an identity of sensitive objects within an image or video and generates the recognition avoidance signal based on the identity of sensitive objects. The sensitive objects may include drug paraphernalia, illegal objects, nudity, etc. For example, the analyzer 204 may determine that an image of a person with a hand that covers 10% of the person's face in combination with a sensitive object in the background result in the generation of a recognition avoidance signal that indicates that the person should not be recognized.

In some embodiments, the analyzer 204 identifies a type of action and determines whether the recognition avoidance signal indicates that the action was taken to discourage recognition of the person based on the type of action. For example, the type of action may include a person putting up a hand to obscure the person's face or pinching a brim of the person's hat. The analyzer 204 may determine that putting the hand up indicates that the person does not want to be recognized and that pinching a brim of the person's hat indicates that the image or video can be shared with a group of users in a social network (e.g., users that the person is connected to in the social network).

In some embodiments, the analyzer 204 may implement machine learning that can generate and/or enhance classifiers for generating a recognition avoidance signal. In some embodiments, machine learning can be implemented in one or more components of the recognition application 103. Trained models may be trained using synthetic data, e.g., data that is automatically generated by a computer, with no use of user information.

In some embodiments, trained models may be trained, e.g., based on training data, for which permissions to utilize user data for training have been obtained expressly from users. The training data may include any data, such as videos and corresponding metadata, that is permitted for use for training, such as synthetic or computer-generated data, data licensed for use for training, etc. The training data may include images and videos that include an action identified as having been taken to discourage recognition of the person. The images and videos may come from videos generated internally, such as those stored on the database 199 of the recognition server 101 or from images and videos received from the second server 120. For example, the second server 120 may be a media server that provides images and videos with metadata that indicates that an action was taken to discourage recognition of the person.

In some embodiments, a trained model may be obtained based on supervised learning, for example, based on training data including images and videos and corresponding metadata. For example, a trained model may include model form or structure (e.g., descriptive of a number and organization of a plurality of nodes into layers of a neural network, with associated weights). In some embodiments, a trained model may be trained such that the analyzer 204 applies the trained model to generate a recognition avoidance signal that indicates that an action was taken to discourage recognition of the person.

In some embodiments, users help create the training data by providing user input. Users may be asked to identify images and videos with an action that was taken to discourage recognition of the person. As a result of user input, the training data may have accurate identification of the types of actions that are taken to discourage recognition of the person.

Based on the training data, the analyzer 204 may generate a trained model that can generate, based on images and videos, recognition avoidance signals that indicate an action was taken to discourage recognition of the person. The trained model may be a temporal action localization model. In various embodiments, the analyzer 204 may use Bayesian classifiers, support vector machines, neural networks, or other learning techniques to generate the trained model.

In some embodiments, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers. For example, nodes of a first layer (e.g., input layer) may receive data as input data or application data. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of labels for an image, a representation of the image that permits comparison of the image to other images (e.g., a feature vector for the image), an output sentence in response to an input sentence, one or more categories for the input data, etc. depending on the specific trained model. In some embodiments, model form or structure also specifies a number and/or type of nodes in each layer.

In different embodiments, a trained model can include a plurality of nodes, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some embodiments, the computation performed by a node may also include applying a step/activation function to the adjusted weighted sum. In some embodiments, the step/activation function may be a non-linear function. In various embodiments, such computation may include operations such as matrix multiplication. In some embodiments, computations by the plurality of nodes may be performed in parallel, e.g., using multiple processors cores of a multicore processor, using individual processing units of a general processing unit or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some embodiments, a trained model may include embeddings or weights for individual nodes. For example, a trained model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The trained model may then be trained, e.g., using data, to produce a result.

The recognition module 206 performs recognition of the person in the image or video. In some embodiments, the recognition module 206 includes a set of instructions executable by the processor 235 to perform the recognition. In some embodiments, the recognition module 206 is stored in the memory 237 of the computing device 200 and can be accessible and executable by the processor 235.

In some embodiments, the recognition module 206 performs recognition of the person responsive to the recognition avoidance signal indicating that an action has not been taken to discourage recognition of the person and/or the recognition avoidance signal corresponds to an avoidance value that falls below a threshold value.

In some embodiments, the recognition module 206 performs recognition of the person by extracting a recognition template. If it is difficult to identify the person in the image, for example, because part of the person's face is obscured, the lighting is too low for recognition, the person's face is in profile, etc. the recognition module 206 may use other images from a same event or other image frames in the same video to perform recognition of the person. In some embodiments, the recognition module 206 may determine an identity of the person based on identifiable information, such as clothing patterns, logos, personal items, a distinctive haircut, an item of jewelry, a tattoo, posture, etc. In some embodiments, the recognition module 206 may use a machine learning classification system to identify the person. In some embodiments, the recognition module 206 may use machine learning to identify the person. The process of using machine learning is described above with reference to generating the recognition avoidance signal and will not be repeated here with reference to identifying the person. The recognition module 206 may index the image in association with the identity of the person.

If the recognition avoidance signal indicates that an action was taken to discourage recognition of the person and/or the recognition avoidance signal corresponds to an avoidance value that meets a threshold value, the recognition module 206 may determine to not recognize the person. If other people are present in the image, the recognition module 206 may instruct the detector 202 to detect another person in the image until all the people in the image have been processed.

Determining to not recognize a person in the image or video may take several forms. For example, in some embodiments, determining to not recognize a person in the image may include deleting the image or video from the storage device 247, archiving the image or video, or downranking the image or video in search results. In other embodiments, determining to not recognize the person may include indexing the image without an association to an identity of the person.

In some embodiments, a person may specify permissions associated with an image and the recognition module 206 may identify the person based on the permissions. For example, a user may provide permissions that allow the images of the user to be identified with people that are associated with the user in a social network (e.g., connected to, following, friends, etc.) but not identify the user in images that are public. As a result, the recognition module 206 may determine that the recognition avoidance signal indicates that the action was taken to discourage recognition of the person and perform recognition of the person. The recognition module 206 may determine permissions associated with the person and identify the person in the image based on the permissions associated with the person. For example, the recognition module 206 may determine based on the permissions that the user does not want to be identified in any images. In another example, the recognition module 206 may determine based on the permissions that the user can be identified in images and videos that are shared with friends, but not the public and, as a result, provide the identification when the images and videos are shared with friends.

In some embodiments, the recognition module 206 may instruct the user interface module 208 to generate graphical data for displaying a user interface that asks an identified person for confirmation that the person did not want to be identified. For example, the recognition module 206 may perform identification of a person, determine based on their permissions that the image is to be deleted, and instruct the user interface module 208 to ask for confirmation before deleting the image.

The user interface module 208 generates graphical data for displaying a user interface. In some embodiments, the recognition module 206 includes a set of instructions executable by the processor 235 to generate the graphical data. In some embodiments, the user interface module 208 is stored in the memory 237 of the computing device 200 and can be accessible and executable by the processor 235.

In some embodiments, the user interface module 208 generate graphical data for displaying a user interface for a user to establish permissions. The permissions relate to how an image or video should be treated. For example, the user may provide a preference that an image or video where the user has indicated that the user does not want to be recognized in the image or video results in the user's identity being associated with the image or video for people related to the user in a social network but not for a version of the image or video that is shared with people that are not related to the user in the social network.

In some embodiments, the user interface module 208 receives instructions from the analyzer 204 or the recognition module 206 to generate a user interface that includes an image or video. The user interface may also include a request for a user to confirm an action. For example, the user interface may include a request for the user to confirm that the user wanted or did not want to be identified in the image or video, that the user wanted the image or video to be shared with a group of people, that the user wanted the image or video to be deleted, archived, or be downgraded in search results, etc.

Example Method

Figure 5:
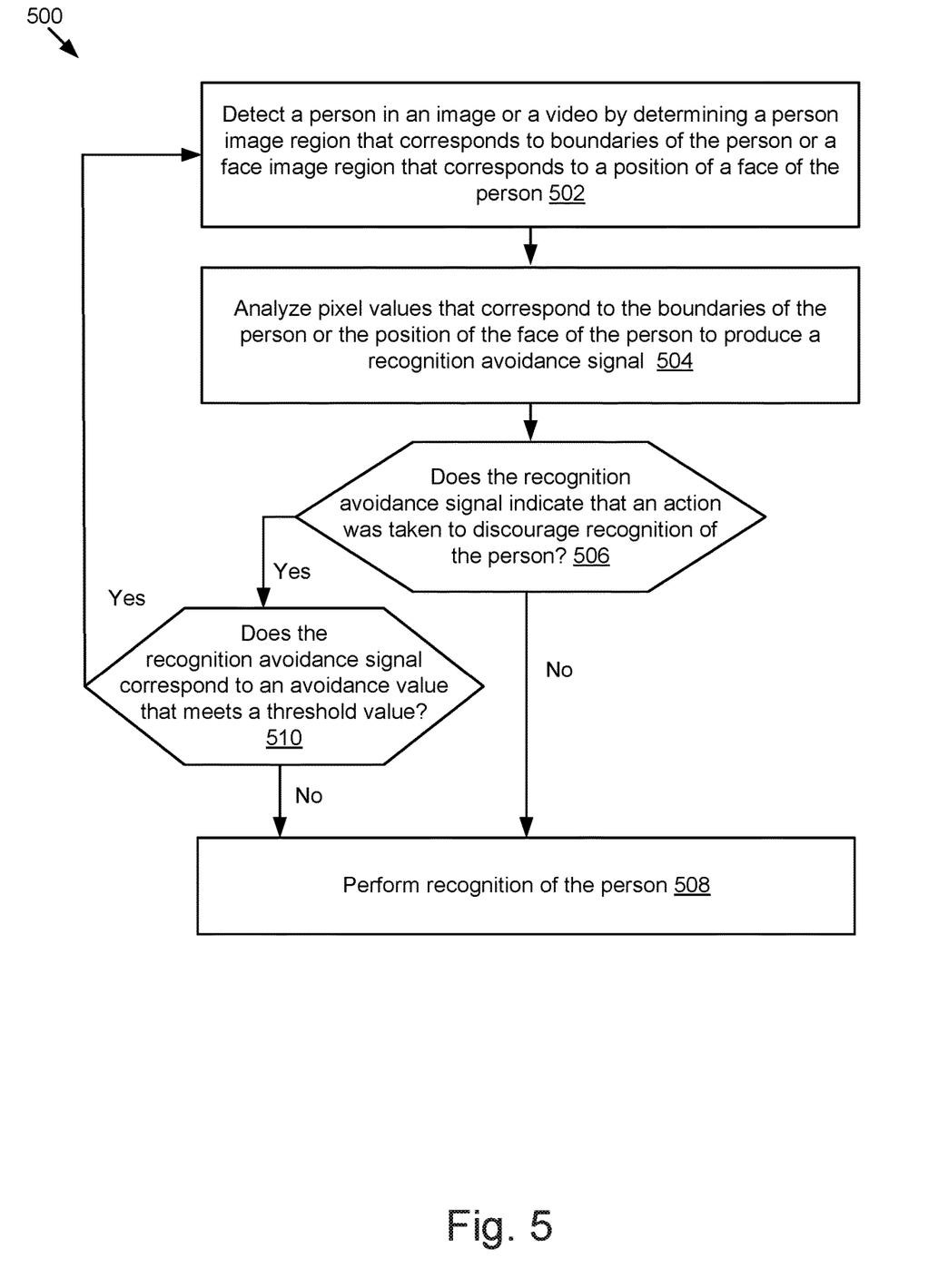
FIG. 5 illustrates a flowchart of an example method to determine whether a person has taken action to discourage recognition in an image according to some embodiments.

FIG. 5 illustrates a flowchart of an example method 500 to determine whether a person has taken action to discourage recognition in an image according to some embodiments. The method 500 is performed by a recognition application 103 stored on a computing device 200, such as a user device 115, a recognition server 101, or in part a user device 115 and in part a recognition server 101.

At block 502, a person is detected in an image or a video by determining a person image region that corresponds to boundaries of the person or a face image region that corresponds to a position of a face of the person. At block 504, pixel values that correspond to the boundaries of the person or the position of the face of the person are analyzed to produce a recognition avoidance signal.

At block 506, it is determined whether the recognition avoidance signal indicates that an action was taken to discourage recognition of the person. If the recognition avoidance signal does not indicate that the action was taken to discourage recognition of the person, at block 508, recognition of the person is performed. If the recognition avoidance signal does indicate that the action was taken to discourage recognition of the person, at block 510, it is determined whether the recognition avoidance signal corresponds to an avoidance value that meets a threshold value. If the avoidance value fails to meet the threshold value, the method 500 moves to block 508 and recognition of the person is performed. If the avoidance value meets the threshold value, the method 500 proceeds to block 502 and detects another person in the image or the video and repeats the method 500 until all people in the image or video have been analyzed.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect or use personal information, the systems provide users with an opportunity to control whether programs or features collect user information (e.g., information about a user's social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A method comprising:
   detecting a person in an image or a video by determining a person image region that corresponds to boundaries of the person or a face image region that corresponds to a position of a face of the person;
   analyzing pixel values that correspond to the boundaries of the person or the position of the face of the person to generate a recognition avoidance signal;
   determining whether the recognition avoidance signal indicates that an action was taken to discourage recognition of the person, wherein the action includes the person using a body part of the person to obscure at least part of the face of the person; and
   responsive to the recognition avoidance signal indicating that the action was taken to discourage recognition of the person, declining to perform recognition of the person.

2. The method of claim 1, wherein declining to perform recognition of the person includes performing at least one of storing the recognition avoidance signal in association with the image or the video to indicate that person recognition is not to be performed, deleting the image or the video, archiving the image or the video, or downranking the image or the video in search results.

3. The method of claim 1, further comprising:
   responsive to the recognition avoidance signal not indicating that the action was taken to discourage recognition of the person, performing recognition of the person by determining an identity of the person and indexing the image or the video in association with the identity.

4. The method of claim 3, further comprising:
   responsive to the recognition avoidance signal indicating that the action was taken to discourage recognition of the person, determining whether the recognition avoidance signal corresponds to an avoidance value that does not meet a threshold value; and
   wherein performing recognition of the person is also responsive to the avoidance value not meeting the threshold value.

5. The method of claim 1, wherein:
   the person is a first person;
   determining that the action was taken to discourage recognition of the person further includes a determination that the recognition avoidance signal corresponds to an avoidance value that meets a threshold value; and
   the method further comprises responsive to the avoidance value meeting the threshold value, detecting a second person in the image or the video and generating the recognition avoidance signal for the second person.

6. The method of claim 1, wherein performing recognition of the person is based on extracting a recognition template.

7. The method of claim 1, wherein the image is a first image associated with an event, the video is a first video associated with the event, and further comprising:
   identifying one or more additional images or one or more additional videos that are associated with the event; and
   determining to not recognize the person within the one or more additional images or the one or more additional videos.

8. The method of claim 1, wherein determining that the recognition avoidance signal indicates that the action was taken to discourage recognition of the person includes determining a type of action and further comprising:
   performing recognition of the person by identifying the person and sharing an identification of the person with a group of users in a social network based on the type of action and not sharing the identification of the person with any users that are not part of the group of users in the social network.

9. A non-transitory computer-readable medium with instructions stored thereon that, when executed by one or more computers, cause the one or more computers to perform operations, the operations comprising:
   detecting a person in an image or a video by determining a person image region that corresponds to boundaries of the person or a face image region that corresponds to a position of a face of the person;
   analyzing pixel values that correspond to the boundaries of the person or the position of the face of the person to generate a recognition avoidance signal;
   determining whether the recognition avoidance signal indicates that an action was taken to discourage recognition of the person, using a body part of the person;
   responsive to the recognition avoidance signal indicating that the action was taken to discourage recognition of the person, determining whether the recognition avoidance signal corresponds to an avoidance value that meets a threshold value; and
   responsive to the recognition avoidance signal not indicating that the action was taken to discourage recognition of the person and the avoidance value not meeting the threshold value, performing recognition of the person.

10. The computer-readable medium of claim 9, wherein performing recognition of the person comprises determining an identity of the person and indexing the image or the video in association with the identity.

11. The computer-readable medium of claim 9, wherein the operations further comprise:
    responsive to the recognition avoidance signal indicating that the action has been taken to discourage recognition of the person, performing at least one of storing the recognition avoidance signal in association with the image or the video to indicate that person recognition is not to be performed, deleting the image or the video, archiving the image or the video, or downranking the image or the video in search results.

12. The computer-readable medium of claim 9, wherein the image or the video is part of a series of images of an event and the recognition avoidance signal is based on an average of a particular avoidance value corresponding to each image in the series of images.

13. The computer-readable medium of claim 9, wherein the action includes the person using an object to obscure at least part of the face of the person or at least part of the face of the person being obscured digitally.

14. The computer-readable medium of claim 9, wherein the operations further comprise:
    determining permissions associated with the person; and
    wherein performing recognition of the person is based on the permissions associated with the person.

15. A system comprising:

one or more processors; and a memory that stores instructions that, when executed by the one or more processors cause the one or more processors to perform operations comprising:

detecting a person in an image or a video by determining a person image region that corresponds to boundaries of the person or a face image region that corresponds to a position of a face of the person;

analyzing pixel values that correspond to the boundaries of the person or the position of the face of the person to generate a recognition avoidance signal;

determining whether the recognition avoidance signal indicates that an action was taken to discourage recognition of the person, wherein the action includes the person using a body part of the person to obscure at least part of the face of the person; and     responsive to the recognition avoidance signal indicating that the action was taken to discourage recognition of the person, declining to perform recognition of the person.

16. The system of claim 15, wherein declining to perform recognition of the person includes performing at least one of storing the recognition avoidance signal in association with the image or the video to indicate that person recognition is not to be performed, deleting the image or the video, archiving the image or the video, or downranking the image or the video in search results.

17. The system of claim 15, wherein the memory stores additional instructions that cause the one or more processors to perform further operations comprising:

responsive to the recognition avoidance signal not indicating that the action was taken to discourage recognition of the person, performing recognition of the person by determining an identity of the person and indexing the image or the video in association with the identity.

18. The system of claim 17, wherein the operations further include:

responsive to the recognition avoidance signal indicating that the action was taken to discourage recognition of the person, determining whether the recognition avoidance signal corresponds to an avoidance value that does not meet a threshold value; and     wherein performing recognition of the person is also responsive to the avoidance value not meeting the threshold value.

19. The system of claim 15, wherein:

the person is a first person;

determining that the action was taken to discourage recognition of the person further includes a determination that the recognition avoidance signal corresponds to an avoidance value that meets a threshold value; and the memory stores additional instructions comprising, responsive to the avoidance value meeting the threshold value, detecting a second person in the image and generating the recognition avoidance signal for the second person.

* * * * *